Oct. 5, 1926.
C. BETHEL
1,602,299
RAILWAY MOTOR MOUNTING
Filed Sept. 22, 1923
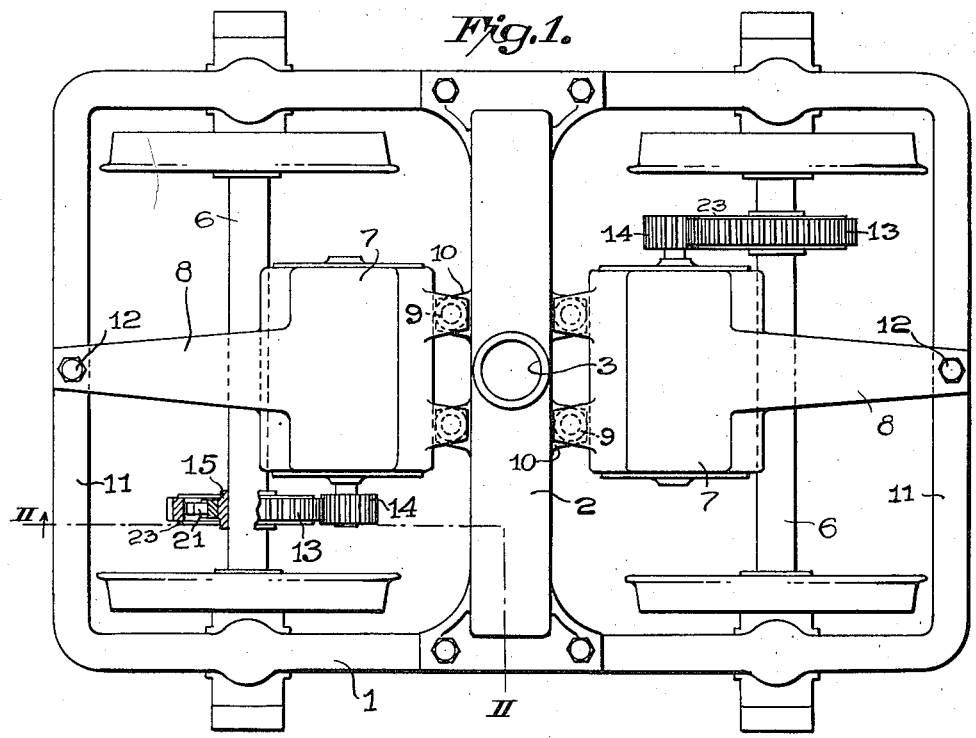
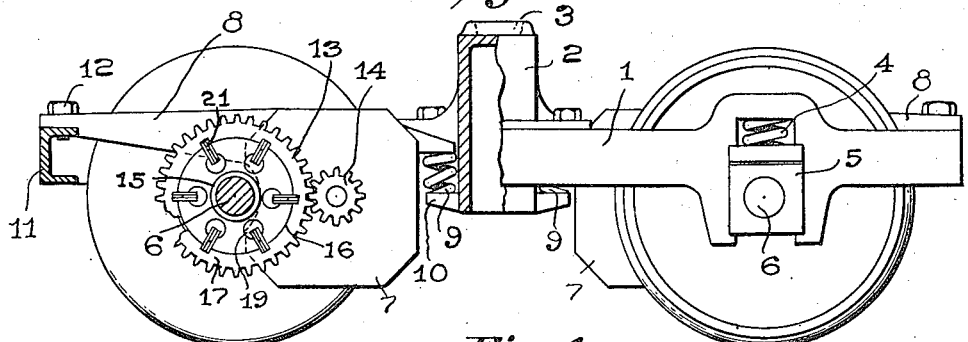
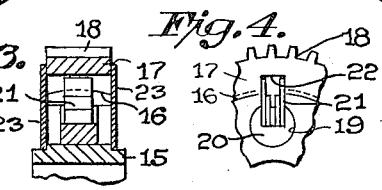
WITNESSES:
R. S. Harrison
W. B. Jaspert
INVENTOR
Claude Bethel,
BY
Eberley G. Carr
ATTORNEY Patented Oct. 5, 1926.

1,602,299

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

RAILWAY MOTOR MOUNTING.

Application filed September 22, 1923. Serial No. 664,234.

My invention relates to railway vehicles, more especially to novel means for mounting or suspending motors on the frame of vehicle trucks.

It is among the objects of my invention to provide a motor mounting for electrically driven railway vehicles, which shall be of simple mechanical construction, which shall embody novel features by way of both construction and operating functions and which shall eliminate carrying excessive weight on the axle that existed in prior structures of this type.

My present invention is directed to a motor drive mechanism for electric railway vehicles in which the motor is supported or carried by springs on the transom of the truck, thus removing the weight from the axle, which is further made possible by the use of flexible driving connections for the motor and wheel axle. The gear centers are maintained by means of an extending portion of the motor that is secured to the truck transom and the journal boxes of the drive axles, while any axle displacement is taken care of by a novel form of flexible gear element that permits of misalinement of its hub member without affecting the engagement of the tooth portion. This type of gear element is similar to that described in my co-pending application Serial No. 661,554, filed Sept. 8, 1923, except for the embodiment of a novel form of spring mounting, which will be hereinafter more fully set forth.

In the accompanying drawing constituting a part hereof and in which like reference characters designate like parts, Fig. 1 is a plan view of a vehicle truck having a motor arrangement and driving connection embodying the principles of my invention.

Fig. 2 is a side elevational view, partially in cross-section along the line II—II of Fig. 1.

Fig. 3 is a view in cross-section of a fragmentary portion of the gear element that is utilized in the driving connection between the motor and axle, and Fig. 4 is view in elevation thereof.

Referring to Figs. 1 and 2, the truck structure herein illustrated comprises a frame 1 of usual form and a bolster 2 having an upwardly extending portion 3 that is adapted to receive the center pin by which the truck is connected to a vehicle body (not shown).

The truck frame 1 is mounted on a plurality of springs 4 which are seated on journal boxes 5 that journal the usual wheel axles 6.

A pair of motors 7, each having a long extending arm portion 8, are mounted on a plurality of coil springs 9, which rest on brackets 10 that extend from the bolster plates 2. Each arm portion 8 is secured to the corresponding bumper frame 11 by a suitable screw or bolt 12. The motors 7 are connected to drive axle 6 by a pinion 14 and a gear-wheel 13. The gear-wheel 13 (best shown in Figs. 3 and 4) comprises a hub portion 15 having a spherically-curved outer periphery 16 adapted to engage a correspondingly shaped seating portion of a rim 17, which is provided with gear teeth 18. The hub member 15 is provided with circular openings 19, which are adapted to receive spring nests structures 20 having leaf springs 21. The structures 20 are secured centrally in the respective openings and extend into slots or recesses 22 of the rim 17. A plurality of annular side or spring plates 23 are secured to the hub 15 and extend therefrom to the sides of rim member 17.

Gear structures of this type are employed to provide a resilient connection between the drive axle 6 and the motor shaft and to permit of angular displacement of the shaft member which functions are effected through the universal movement of the hub that is permitted by reason of the spherically-curved engaging surfaces of the hub and the gear rim. The spring plates 23 function to yieldingly restrain lateral movement of the rim member on the hub and to further provide a lubricating chamber for the bearing portions of the hub and rim and the spring nests 20.

This flexible construction of the gear-wheel as described in my copending application referred to above, permits of relative movement of the motor axles and the truck frame members without affecting the gear tooth engagement between gear-wheel 13 and pinion 14. It further relieves the operating mechanism, particularly the motor, from the severe strains imparted to the mechanism under abnormal operating conditions.

It is evident from the above description of my invention that railway vehicle trucks embodying the features herein set forth provide a simple and efficient truck structure and gear element that are novel in the art.

Although I have described a specific embodiment of my invention, it will be obvious to those skilled in the art that various modifications may be made in the structural details of the several parts, such as the gear-wheel and motors, without departing from the principles herein set forth.

I claim as my invention:—

1. A railway vehicle truck comprising a frame structure journalled on a plurality of wheel axles, driving motors severally having two supports, one a substantially rigid support on one side by the corresponding end portion of said frame and the other a resilient support by spring members at the opposite side on a transom of the truck, a gear mechanism for connecting the motors to said axles, some of the gear wheels of said mechanisms having a yielding and universal connection of their respective rim and hub portions.

2. A railway vehicle truck comprising a frame structure journalled on a plurality of wheel axles, driving motors severally having two supports, one a substantially rigid support on one side by the corresponding end portion of said frame and the other a resilient support by spring members at the opposite side on a transom of the truck, and gear mechanism for connecting the motors to said axles, some of the gear wheels of said mechanism having a yielding and universal connection of their respective rim and hub portions, and said motors, axles and truck frame being relatively movable.

3. A railway vehicle, comprising a frame structure flexibly mounted upon wheel axles of the vehicle, a plurality of motors flexibly mounted on said frame with their armature shafts substantially parallel to said axles, and a plurality of gear-wheels respectively secured on said axles and shafts in co-operative engagement, certain of said gear-wheels comprising a hub and rim construction joined by a plurality of radially disposed spring nests, the hub and rim having spherically curved engaging surfaces.

4. A railway vehicle, comprising a frame structure flexibly mounted upon wheel axles of the vehicles, a plurality of motors flexibly mounted on said frame with their armature shafts substantially parallel to said axles, and a plurality of gear-wheels respectively secured on said axles and shafts in co-operative engagement, certain of said gear-wheels comprising a hub and rim construction joined by a plurality of radially disposed spring nests, the hub and rim having spherically-curved engaging surfaces and side plates for yieldingly restraining the rim member.

5. A railway vehicle, comprising a frame structure flexibly mounted upon wheel axles of the vehicle, a plurality of motors flexibly mounted on said frame with their armature shafts substantially parallel to said axles, and a plurality of gear-wheels respectively secured on said axles and shafts in co-operative engagement, some of said gear-wheels comprising hub and rim members having spherically curved engaging curfaces and resilient means for joining said hub and rim members.

6. A railway vehicle truck comprising a frame structure journalled on a plurality of wheel axles, driving motors having corresponding sides resiliently supported on the opposite sides of a transom of the truck and their other sides substantially rigidly supported on the corresponding end portions of the frame structure and gear mechanism for connecting the motors to said axles, some of the gear wheels of said mechanism comprising a hub and rim construction having spherically curved engaging faces and resilient joining means.

7. A railway vehicle comprising a frame structure flexibly mounted upon wheel axles of the vehicle, a plurality of motors flexibly mounted on said frame with their armature shafts substantially parallel to said axles, and a plurality of gear wheels, some of which are spherically seated flexible gear wheels respectively secured on said axles and shafts in co-operative engagement.

In testimony whereof, I have hereunto subscribed my name this 18th day of September, 1923.

CLAUDE BETHEL.